US008498312B2

(12) United States Patent
Pekonen et al.

(10) Patent No.: US 8,498,312 B2
(45) Date of Patent: Jul. 30, 2013

(54) TRANSMISSION OF PHYSICAL LAYER SIGNALING IN A BROADCAST SYSTEM

(75) Inventors: Harri Pekonen, Raisio (FI); Jussi Vesma, Turku (FI); Tero Jokela, Turku (FI)

(73) Assignee: Nokia Corporation (FI)

( * ) Notice: Subject to any disclaimer, the term of this patent is extended or adjusted under 35 U.S.C. 154(b) by 244 days.

(21) Appl. No.: 12/244,408

(22) Filed: Oct. 2, 2008

(65) Prior Publication Data

US 2010/0085985 A1      Apr. 8, 2010

(51) Int. Cl.
*H04J 3/24* (2006.01)

(52) U.S. Cl.
USPC .......................................................... 370/474

(58) Field of Classification Search
USPC ................. 370/229–235, 252, 253, 260, 328, 370/207, 329, 335, 342, 376, 395.4, 459, 370/468
See application file for complete search history.

(56) References Cited

U.S. PATENT DOCUMENTS

| | | | | |
|---|---|---|---|---|
| 4,541,008 | A * | 9/1985 | Fishman et al. | 375/240.01 |
| 6,201,970 | B1 * | 3/2001 | Suzuki et al. | 455/450 |
| 7,224,675 | B1 * | 5/2007 | Merkle et al. | 370/330 |
| 2004/0082356 | A1 * | 4/2004 | Walton et al. | 455/522 |
| 2008/0299955 | A1 * | 12/2008 | Lee et al. | 455/414.1 |
| 2009/0164873 | A1 * | 6/2009 | Pekonen et al. | 714/776 |

FOREIGN PATENT DOCUMENTS

EP      0975115 A1      1/2000

OTHER PUBLICATIONS

"Frame structure channel coding and modulation for a second generation digital terrestrial television broadcasting system (DVB-T2)", DVB Document A122, Jun. 2008, pp. 1-158.
DVB Organization: "T2_SSS_010DRAFTbaseline_SSS-section_r001.doc", DVB, Digital Video Broadcasting, Sep. 15, 2007 pp. 1-6, XP017817495, Geneva—Switzerland, Section 5.7.2 Section 5.7.2.3 Section 5.7.3.
DVB Organization: "90chapter_4.7.2.2.1_L1 Signalling data_0_2_1.pdf", DVB, Digital Video Broadcasting, Mar. 3, 2008, pp. 1-96, XP017817221, Geneva Switzerland, Sections 4.71.2.1- 4.7.2.2.2.
International Search Report mailed Nov. 19, 2010.

* cited by examiner

*Primary Examiner* — Kevin C Harper
*Assistant Examiner* — Samina Choudhry
(74) *Attorney, Agent, or Firm* — Banner & Witcoff, Ltd.

(57) ABSTRACT

Aspects of the invention provide apparatuses, computer media, and methods for supporting the broadcast of signaling data over a network. Signaling data is encoded, partitioned into M signaling segments, and distributed over M corresponding data frames. A data stream with the partitioned signaling data is transmitted through a digital terrestrial television broadcasting system, where the partitioned signaling data may include physical layer configurable data. The number of distributed signaling segments may be determined from a predetermined value or from a parameter contained in pre-signaling data. The number of physical layer pipes supported by signaling data may be increased by separating the static signaling part and the dynamic signaling part, dividing static signaling part into signaling segments, and interleaving the signaling segments over the data frames. The number of physical layer pipes can be further increased by adding at least one P2 symbol.

43 Claims, 12 Drawing Sheets

| Max #PLP | needed 8k P2 symbols | | | |
|---|---|---|---|---|
| | BPSK | QPSK | 16-QAM | 64-QAM |
| 2 8k P2 symbols | | | | |
| L1-dyn Repetition | 14 | 31 | 64 | 97 |
| No repetition | 19 | 43 | 87 | 132 |
| 3 8k P2 symbols | | | | |
| L1-dyn Repetition | 25 | 51 | 106 | 160 |
| No repetition | 34 | 70 | 144 | 216 |
| Increase | 79% | 65% | 66% | 65% |
| 4 8k P2 symbols | | | | |
| L1-dyn Repetition | 36 | 74 | 148 | 224 |
| No repetition | 49 | 100 | 201 | 256 |
| Increase | 157% | 139% | 131% | 131% |

| Max #PLP | needed 8k P2 symbols | | | |
|---|---|---|---|---|
| | BPSK | QPSK | 16-QAM | 64-QAM |
| 3 8k P2 symbols | | | | |
| L1-dyn Repetition | 39 | 81 | 167 | 250 |
| No repetition | 68 | 138 | 256 | 256 |
| 4 8k P2 symbols | | | | |
| L1-dyn Repetition | 58 | 115 | 233 | 256 |
| No repetition | 97 | 196 | 256 | 256 |
| Increase | 56% | 59% | 58% | 56% |

TRANSMISSION OF PHYSICAL LAYER SIGNALING IN A BROADCAST SYSTEM

BACKGROUND

Digital Video Broadcasting (DVB) systems distribute data using a variety of approaches, including by satellite (DVB-S, DVB-S2 and DVB-SH), DVB-SMATV for distribution via SMATV), cable (DVB-C), terrestrial television (DVB-T, DVB-T2), and digital terrestrial television for handhelds (DVB-H, DVB-SH). The associated standards define the physical layer and data link layer of the distribution system. Devices interact typically with the physical layer through a synchronous parallel interface (SPI), synchronous serial interface (SSI), or asynchronous serial interface (ASI). Data is typically transmitted in MPEG-2 transport streams with some additional constraints (DVB-MPEG).

The distribution systems for the different DVB standards differ mainly in the modulation schemes used and error correcting codes used, due to the different technical constraints. For example, DVB-S (SHF) uses QPSK, 8PSK or 16-QAM. DVB-S2 uses QPSK, 8PSK, 16APSK or 32APSK, based as a broadcaster's option. QPSK and 8PSK are the only versions regularly used. DVB-C (VHF/UHF) uses QAM: 16-QAM, 32-QAM, 64-QAM, 128-QAM or 256-QAM. DVB-T (VHF/UHF) uses 16-QAM or 64-QAM (or QPSK) in combination with COFDM and can support hierarchical modulation.

The DVB-T2 standard (e.g., "Frame structure channel coding and modulation for a second generation digital terrestrial television broadcasting system (DVB-T2)," DVB Document A122, June 2008) is an update for DVB-T to provide enhanced quality and capacity. It is expected that the DVB-T2 standard will provide more-robust TV reception and increase the possible bit-rate by over 30% for single transmitters (as in the UK) and is expected to increase the maximum bit rate by over 50% in large single-frequency networks (as in Germany, Sweden).

However, mobile services typically need lower bit rates with a greater number of physical level channels (e.g., physical level pipes) than services that may be currently supported by the DVB-T2 standard. Thus, there is a real market need to further enhance signaling capacity in order to support services for mobile devices with the available broadcast spectrum.

SUMMARY

An aspect provides apparatuses, computer-readable media, and methods for supporting the broadcast of signaling data over a network. Signaling data that is static over a desired duration may be partitioned into a plurality of signaling segments, thus enhancing the capacity of the signaling data and increasing the number of supported physical layer pipes.

According to another aspect of the invention, a signaling data is encoded, partitioned into M signaling segments, and distributed over M corresponding data frames.

According to another aspect of the invention, a data stream with the partitioned signaling data is transmitted through a digital terrestrial television broadcasting system. The partitioned signaling data may include signaling data that is static relative to a frame duration, e.g., physical layer configurable data.

According to another aspect of the invention, the number of distributed signaling segments may be determined from a predetermined value or from a parameter contained in pre-signaling data.

According to another aspect of the invention, the number of physical layer pipes supported by signaling data may be increased by separating the static signaling part and the dynamic signaling part, dividing static signaling part into signaling segments, and interleaving the signaling segments over a plurality of data frames. The number of physical layer pipes can be further increased by adding at least one P2 symbol.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 4 shows an increase of physical layer pipes as the number of P2 symbols increases in accordance with an embodiment of the invention.

FIG. 5 shows an increase of physical layer pipes as the number of P2 symbols increases when configurable data is distributed over four frames in accordance with an embodiment of the invention.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
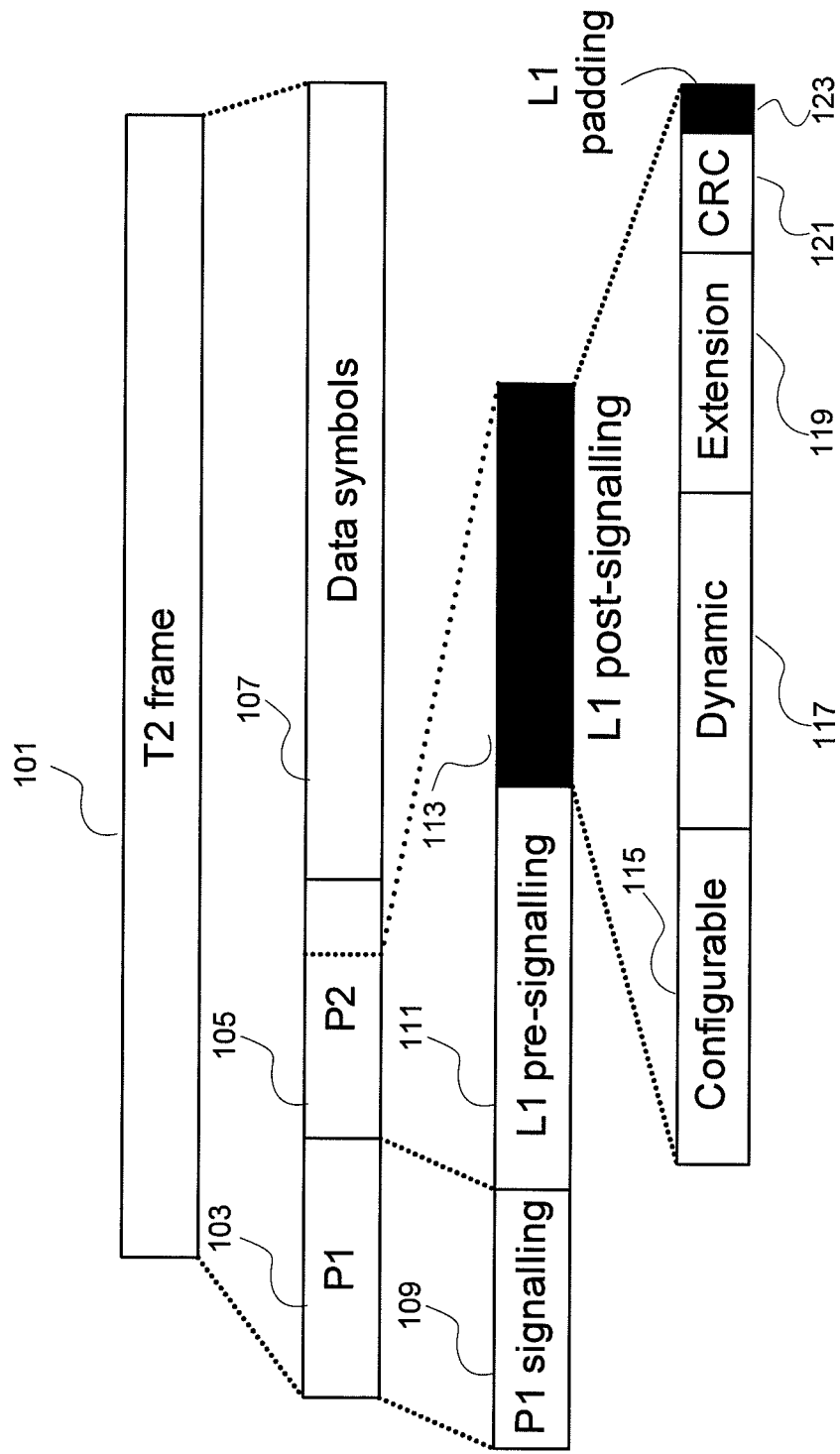
FIG. 1 shows physical layer (L1) signaling transmission in T2 frames in accordance with prior art.

FIG. 1 shows layer 1 (L1) signaling transmission in T2 frame 101 corresponding to the physical layer as specified in "Frame structure channel coding and modulation for a second generation digital terrestrial television broadcasting system (DVB-T2)," DVB Document A122, June 2008 in accordance with prior art. The physical layer is the first (i.e. the lowest) level in the seven-layer OSI model. The physical layer translates communications requests from the data link layer into hardware-specific operations to effect transmission or reception of electronic signals. The bit stream may be grouped into code words or symbols and converted to a physical signal that is transmitted over a hardware transmission medium.

Each frame 101 contains one P1 symbol 103, P2 symbols 105, and data symbols 107. (Each frame typically includes only one P1 symbol, although embodiments may include a plurality of P1 symbols.) P1 symbol 103 is fixed pilot symbol that carries P1 signaling information 109 and is located in the beginning of frame 101 within each RF-channel. P1 symbol 103 is typically used for a fast initial signal scan. P2 symbols 105 are pilot symbols located right after P1 symbol 103 with the same FFT-size and guard interval as the data symbols. P2 symbols carry L1 pre-signaling information 111 and L1 post-signaling information 113. The number of P2 symbols depends on the FFT-size. P2 symbols 105 are typically used for fine frequency and timing synchronization as well as for initial channel estimates. Data symbols 107 are OFDM symbols in frame 101 that are not P1 or P2 symbols. Data symbols 107 typically convey data content that are associated with different physical layer pipes (PLPs). T2 frames are further grouped into super frames, consisting of selected number of frames.

L1 signaling is divided into pre-signaling (L1-pre) 111 and post-signaling (L1-post) signaling 113, where L1-pre 111 acts as a key for receiving L1 post-signaling 113 including the PLP mappings.

L1-post 113 is further divided into configurable part 115 and dynamic part 117, where configurable parameters comprise static signaling data that may change only at super frame border. Configurable parameters change only when the system configuration is changed (e.g., when PLPs are added or removed). Dynamic parameters refer to the mapping of each PLP to T2 frame 101 and may change from frame to frame. Configurable and dynamic parts 115 and 117 of L1 post-signaling 113 are transmitted in the same code words.

L1 post signaling 113 may also include optional extension field 119 that allows for expansion of L1 post-signaling. CRC (cyclic redundancy check) 121 provides error detection of any errors that may occur in L1 post-signaling 113. A 32-bit error detection code is applied to the entire L1 post-signaling 113 including configurable part 115, dynamic part 117, and extension part 119. L1 padding 123 is a variable-length field that is inserted following the L1-post CRC field 121 to ensure that multiple LDPC blocks of the L1 post-signaling have the same information size when the L1 post-signaling is segmented into multiple blocks and when these blocks are separately encoded. L1-padding also makes the total size of the L1-post an integer multiple of the number of P2 symbols. The values of the L1 padding bits, if any, are set to "0".

Different PLPs may have different coding and modulation parameters. The information on how to decode the different PLPs is signaled in the physical layer signaling. L1 signaling is transmitted in a preamble consisting of P2 OFDM symbols. In DVB-T2, the number of P2 symbols is fixed for the used Fast Fourier Transform (FFT) size. Therefore, the capacity of the P2 symbols limits the maximum number of PLPs that can be signaled in the L1 signaling. The number of PLPs that can be signaled with FFT-sizes smaller than 32 k when L1-dyn repetition is used for different L1 signaling modulation schemes is: 14 PLPs (BPSK), 31 PLPs (QPSK), 64 PLPs (16-QAM), and 97 PLPs (64-QAM). L1-dyn repetition is a signaling option where the dynamic signaling for the frame m is not sent only in P2 symbols of frame m but also in P2 symbols of frame m−1. Therefore, when the repetition is used, each frame carries the L1-dyn for the current and the next frame.

For example, when 16-QAM with a code rate ½ is used for data transmission, L1 post-signaling typically uses QPSK modulation to provide greater robustness than the data path. This configuration corresponds to 31 PLPs being used for signaling. With a system capacity of 10 to 15 Mbps, the average bit rate is approximately 322 to 484 kbps for each PLP. Corresponding rates may be too high for mobile services that typically require rather low bit rates. For example, typical good quality radio service uses 48 kbps. As will be discussed, the number of supported PLPs may be increased. If the number of supported PLPs is increased to 81, the average bit rate is approximately 123 to 185 kbps for the above system capacity.

Furthermore, scalable video or audio codecs may be used, where different layers of one service are transmitted in different PLPs. This approach may be used for example to provide different robustness for separate media layers and/or to support for receivers with different media rendering capabilities or quality requirements. The number of needed PLPs for scalable codecs may be higher than the amount of services. Consequently, conventional systems may not be able to provide a sufficient number of PLPs when supporting services for mobile devices.

Figure 2:
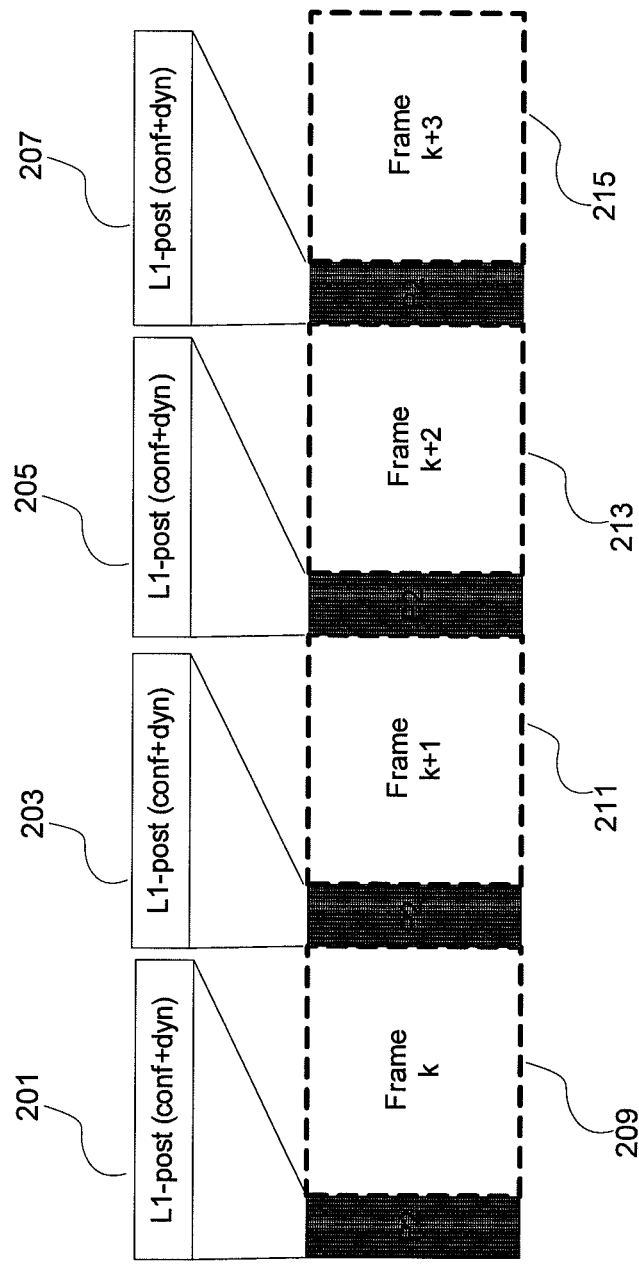
FIG. 2 shows transmission of physical layer post-signaling data in accordance with prior art.

FIG. 2 shows transmission of physical layer post-signaling data in accordance with prior art. Each frame 209, 211, 213, and 215 includes separate post-signaling data (configurable (conf) and dynamic (dyn) data) 201, 203, 205, and 207, respectively. Consequently, part of the signaling data may be repeated in consecutive frames if the signaling data is unchanged (static). Specifically, as discussed above, the configurable data may change only at super frame borders, which makes it static at least over a duration of a super frame.

Figure 3:
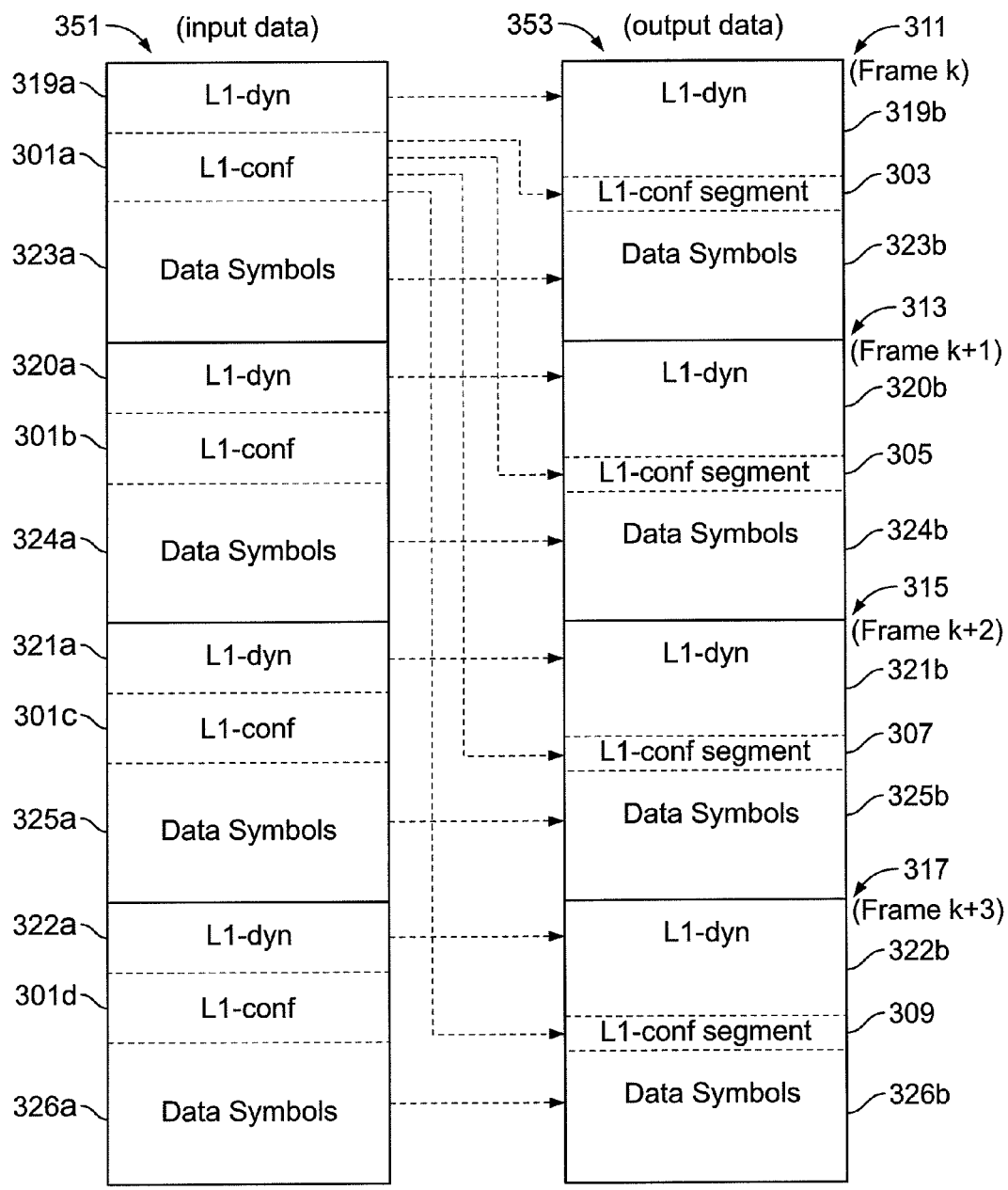
FIG. 3 shows mapping of physical layer post-signaling data in accordance with an embodiment of the invention.

FIG. 3 shows a mapping of physical layer post-signaling data in accordance with an embodiment of the invention. (With some embodiments of the invention, the ordering of L1-dyn and L1-conf may be reversed.) In order to increase the number of PLPs, configurable and dynamic signaling may be separated into corresponding code words and the configurable signaling data, which remains static at least over a super frame, is interleaved over several T2 frames rather than transmitted in each frame. This approach may reduce the capacity reserved by the L1 post-signaling data and thus increase the amount of PLPs that can be signaled as will be discussed.

Conventional systems typically transmit input data 351 on a data stream to a receiving device. However, with an embodiment, input data 351 is mapped into output data 353, which is then transmitted on a data stream to a receiving device (not shown).

Signaling data includes both a static signaling part and dynamic signaling part, where the static signaling part and the dynamic signaling part include static and dynamic parameters, respectively, for the PLP mapping on the data stream. With an embodiment of the invention, configurable signaling data is static because it does not change over a frame interval for data 351. Consequently, configurable data (static signaling part) 301a, 301b, 301c, and 301d are the same. However, dynamic data 319a, 320a, 321a, and 322a may change over each frame. The PLP mapping for data symbols 323a, 324a, 325a, and 326a are contained in signaling data 319a/301a, 320a/301b, 321a/301c, and 322a/301d, respectively. Also, data symbols 323a, 324a, 325a, and 326a map to data symbols 323b, 324b, 325b, and 326b for frames 311, 313, 315, and 317, respectively.

Because the dynamic signaling part may change from data frame to data frame, dynamic signaling data is mapped into each data frame, where dynamic data 319a, 320a, 321a, and 322a maps into dynamic data 319b, 320b, 321b, and 322b for frames 311, 313, 315, and 317, respectively. However, because configurable data 301a, 301b, 301c, and 301d are the same (static over frames 311, 313, 315, and 317), only configurable data 301a (which may include encoded bits) is mapped into output data 353 by segmenting configurable data 301a into data segments 303, 305, 307, and 309 corresponding to frames 311, 313, 315, and 317, respectively. In the example shown in FIG. 3, the frame interval is 4 frames, so each data segment 303, 305, 307, and 309 requires approximately one quarter the data bandwidth of configurable data 301a. Consequently, the data bandwidth conserved by segmenting the configurable data may be used for additional signaling data, e.g., increasing the number of supported PLPs. For example, the data bandwidth of dynamic data 319b, 320b, 321b, and 322b may be expanded (as illustrated in FIG. 3) to include additional dynamic PLP mapping information. Also, the conserved bandwidth may be allocated to the configurable data (corresponding to the combination of data segments 303, 305, 307, and 309) to include additional static PLP mapping information or to include more data cells per frame.

With an embodiment of the invention, the number of signaling segments may be fixed (i.e., a predetermined value) to some value, e.g., 4 signaling segments can be used, as shown in FIG. 3. Consequently, the receiver knows which part of the L1-conf signaling is associated with a particular frame. However, with other embodiments of the invention, the number of signaling segments may be signaled to the receiver, e.g., in the L1 pre-signaling data. Consequently, the receiver knows which signaling segments are transmitted in which frames since the number of signaling segments is constant over a super frame. (A super frame is a set of frames consisting of a particular number of consecutive frames.) With an embodiment of the invention, the super frame length is an integer multiple of the configurable data repetition rate (in frames), which is 4 in the example shown in FIG. 3.

With another embodiment of the invention, the static signal part is transmitted only in one data frame during the frame interval. For example, configurable data 301a may be transmitted only in one of frames 311, 313, 315, and 317. The amount of conserved data bandwidth is approximately the same as the embodiment discussed above. However, by segmenting the static signaling data over the data frames in the frame interval, as shown in FIG. 3, signaling data is evenly spread over the data frames to achieve time interleaving gain against burst errors.

FIG. 4 shows the increase of the maximum number of signaled physical layer pipes as the number of P2 (signaling) symbols per frame increases in accordance with an embodiment of the invention. (With FIG. 4 the configurable data is not segmented and is sent in its entirety in each frame.) Entries 401 and 403 correspond to the PLP capacity that is supported by conventional systems, where the number of P2 symbols is two. To further increase the amount of PLPs the number of P2 (signaling) symbols (which are associated with post-signaling data) may be increased. FIG. 4 shows the number of PLPs that can be supported with 2 P2 symbols (entries 401 and 403), 3 P2 symbols (entries 405 and 407), and 4 P2 symbols (entries 409 and 411) (Repetition corresponds to dynamic data being repeated over two frames.) As the number of P2 symbols increases, the number of supported PLPs increases. For example, with QPSK modulation, the number of PLPs may increase from 31 to 51 when the number of P2 symbols increases from 2 to 3 with repetition.

FIG. 5 shows the increase of the maximum number of signaled physical layer pipes as the number of P2 symbols increases when configurable data (L1-config) is distributed over four frames in accordance with an embodiment of the invention. Entries 501 and 503 show the PLP capacity for 3 P2 symbols, while entries 505 and 507 show the PLP capacity for 4 P2 symbols. By distributing (splitting) the configurable signaling over 4 frames when using 3 P2 symbols, the maximum number of PLPs for QPSK modulation may be increased from 51 to 81 (comparing entry 405 as shown in FIG. 4 with entry 501). The expected PLP increase, as shown in FIG. 5, is amenable to mobile-targeted services.

With some embodiments of the invention, the super frame length (expressed in T2 frames) is an integer multiple of the L1-conf repetition rate. For example, with an L1-conf repetition rate of 4 frames as shown in FIG. 3, a corresponding super frame may contain 12 frames.

The above approach may be applied to any data that is static (in size and content) during the interleaving/repetition period. (With the example shown in FIG. 3, data is static if the content remains the same over 4 frames.) Therefore, interleaving of data may be applied to L1 pre-signaling data but typically not to L1 dynamic data. For instance, L1 configurable data may be sent during four frames as shown in FIG. 3 and L1 pre-signaling data during eight frames (which may overlap the same four frames as the configurable data). L1 pre-signaling data may typically have a longer period because it may change quite seldom and access delay to L1 pre-signaling data may be longer.

Figure 6:
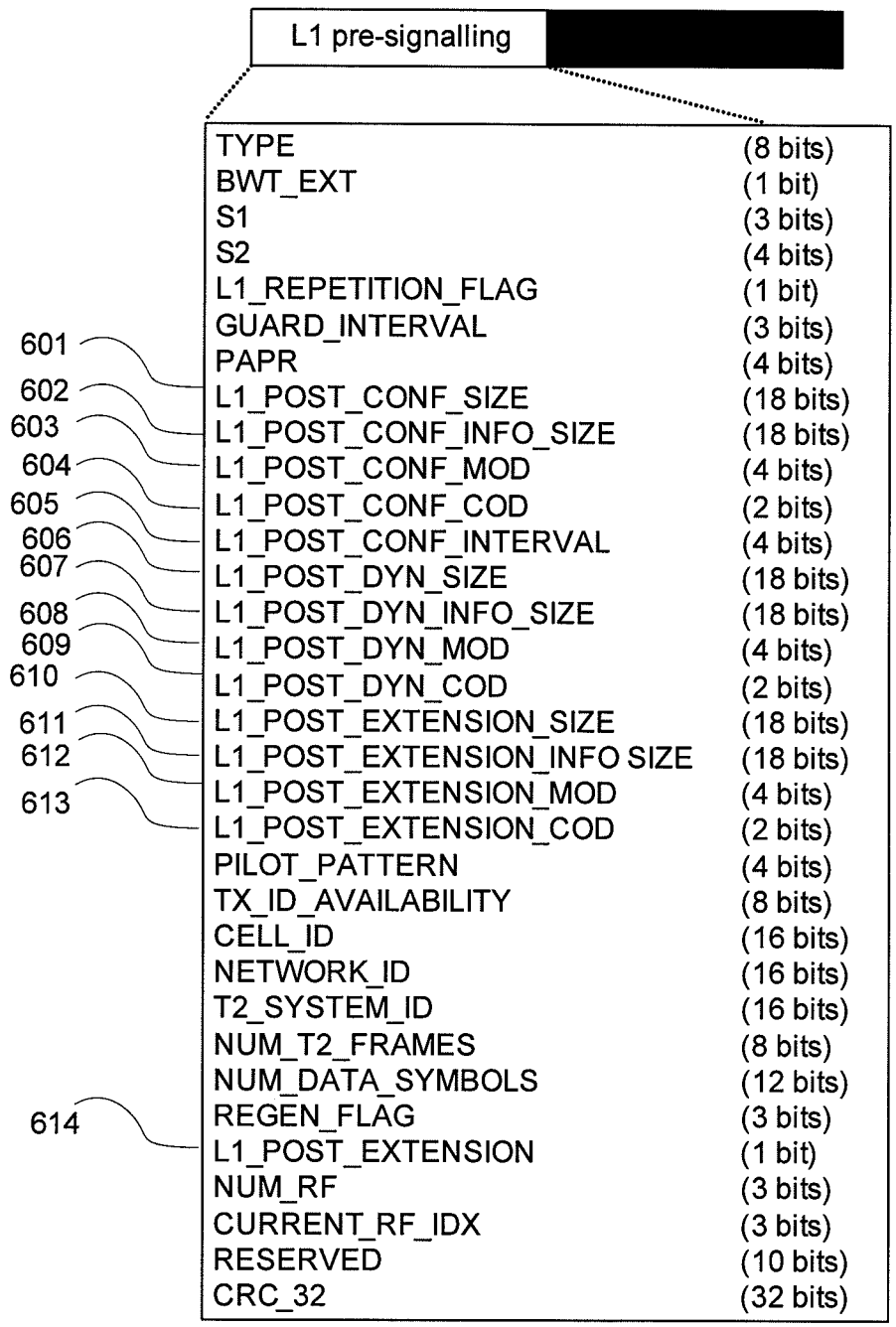
FIG. 6 shows additional pre-signaling parameters in accordance with an embodiment of the invention.

FIG. 6 shows the pre-signaling parameters in accordance with an embodiment of the invention. Pre-signaling data, configurable data, dynamic data for current and next frames, and extension data are encoded separately by shortened Bose-Chaudhuri-Hocquenghem (BCH) and low density parity check (LDPC) coding thus enabling separate modulation and coding for each part. To enable this separation, T2 signaling parameters L1_MOD, L1_COD, L1_POST_SIZE and L1_POST_INFO_SIZE in pre-signaling data may be replaced by separate parameters for each separate part of the signaling data. (FIG. 6 and the list below may not show an entire set of parameters for some embodiments. For example, additional parameters may include T2 parameters, e.g., L1_FEC_TYPE as shown in DVB Document A122. Furthermore, separate L1_FEC_TYPE parameters may be included for each separate part of the signaling data) With an embodiment, additional bits are allocated to L1-pre signaling. As an example, the parameters (shown in FIG. 6) comprise modulation (MOD) and coding (COD) parameters for the different parts, number of sub-segments (signaling segments) L1-post conf is split in (L1_POST_CONF_INTERVAL 605) and size of each part (SIZE and INFO_SIZE). Short descriptions of the additional L1-pre signaling parameters are shown below.

- L1_POST_CONF_SIZE (601): This 18-bit field indicates the size of the coded and modulated L1 post conf signalling data block, in OFDM cells. (An OFDM cell is the modulation value for one OFDM carrier during one OFDM symbol.)
- L1_POST_CONF_INFO_SIZE (602): This 18-bit field indicates the size of the information part of the L1 post conf signalling data block in bits.
- L1_POST_CONF_MOD (603): This 4-bit field indicates the constellation of the L1 post conf signalling data block. (A constellation is a collection of constellation points, where each constellation point corresponds to an OFDM cell.)
- L1_POST_CONF_COD (604): This 2-bit field describes the coding of the L1 post conf signalling data block.
- L1_POST_CONF_INTERVAL (605): This 4-bit field indicates the number of sub-segments (signalling segments) L1 post conf is split into.

L1_POST_DYN_SIZE (606): This 18-bit field indicates the size of the coded and modulated L1 post dyn signalling data block, in OFDM cells.

L1_POST_DYN_INFO_SIZE (607): This 18-bit field indicates the size of the information part of the L1 post dyn signalling data block in bits.

L1_POST_DYN_MOD (608): This 4-bit field indicates the constellation of the L1 post dyn signalling data block.

L1 POST_DYN_COD (609): This 2-bit field describes the coding of the L1 post dyn signalling data block.

L1_POST_EXTENSION_SIZE (610): This 18-bit field indicates the size of the coded and modulated L1 post extension signalling data block, in OFDM cells.

L1_POST_EXTENSION_INFO_SIZE (611): This 18-bit field indicates the size of the information part of the L1 post extension signalling data block in bits.

L1_POST_EXTENSION_MOD (612): This 4-bit field indicates the constellation of the L1 post extension signalling data block L1_POST_EXTENSION_COD (613): This 2-bit field describes the coding of the L1 post extension signalling data block.

Figure 7:
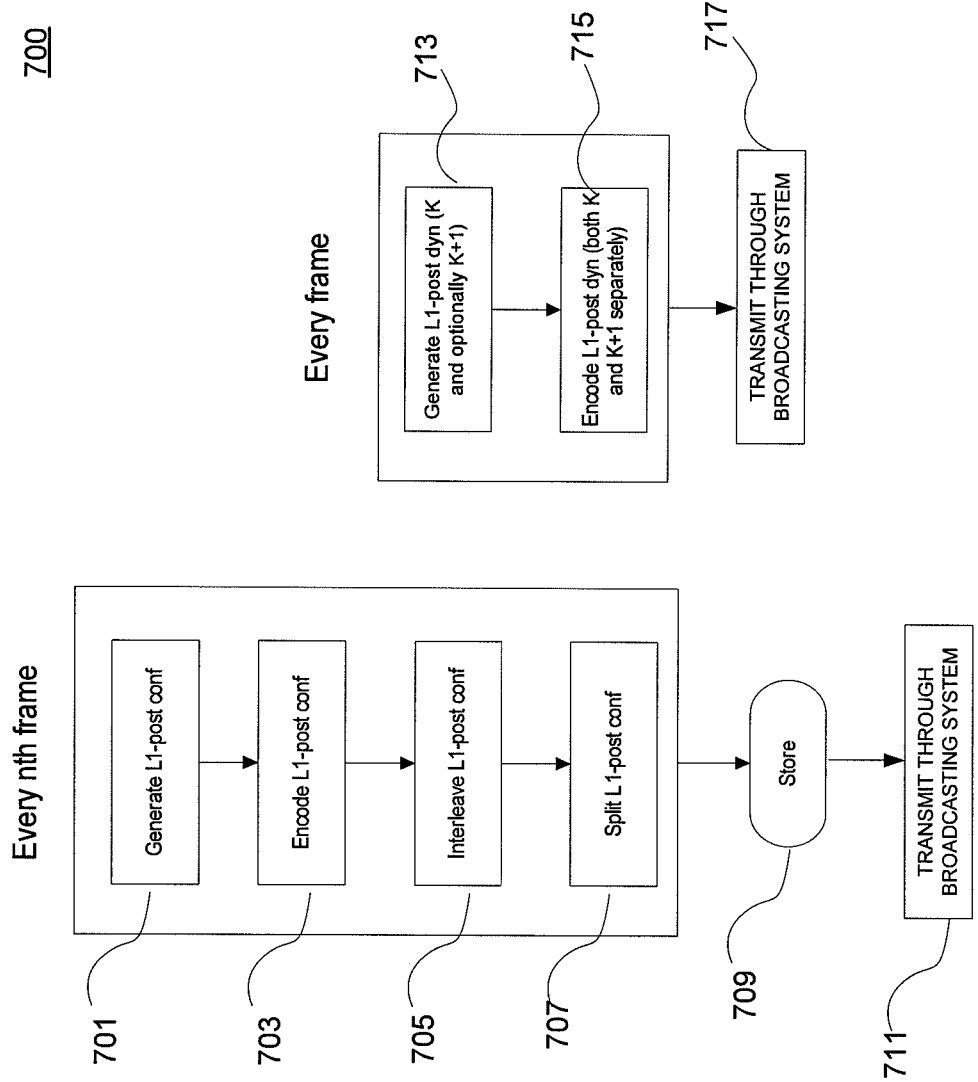
FIG. 7 shows a flow diagram for encoding physical layer post-signaling data in accordance with an embodiment of the invention.

FIG. 7 shows flow diagram 700 for encoding physical layer post-signaling data in accordance with an embodiment of the invention. Configurable data is processed in steps 701-711 while dynamic data is processed in steps 713-717.

Configurable data is generated in step 701 and encoded in step 703. In step 705 the encoded configurable data is interleaved over the desired number of signaling segments in order to obtain time diversity. The signaling data may be stored in step 709 and subsequently transmitted through a digital terrestrial television broadcasting system in step 711.

Because dynamic data typically changes from frame to frame, dynamic data is sent in each frame. In step 713, dynamic data is generated for the current frame (K) as well as the next frame (K+1) in case the optional L1-dyn repetition is used. In step 715, the dynamic data is encoded and is transmitted through the digital terrestrial television broadcasting system with the segmented configurable data in step 717.

Figure 8:
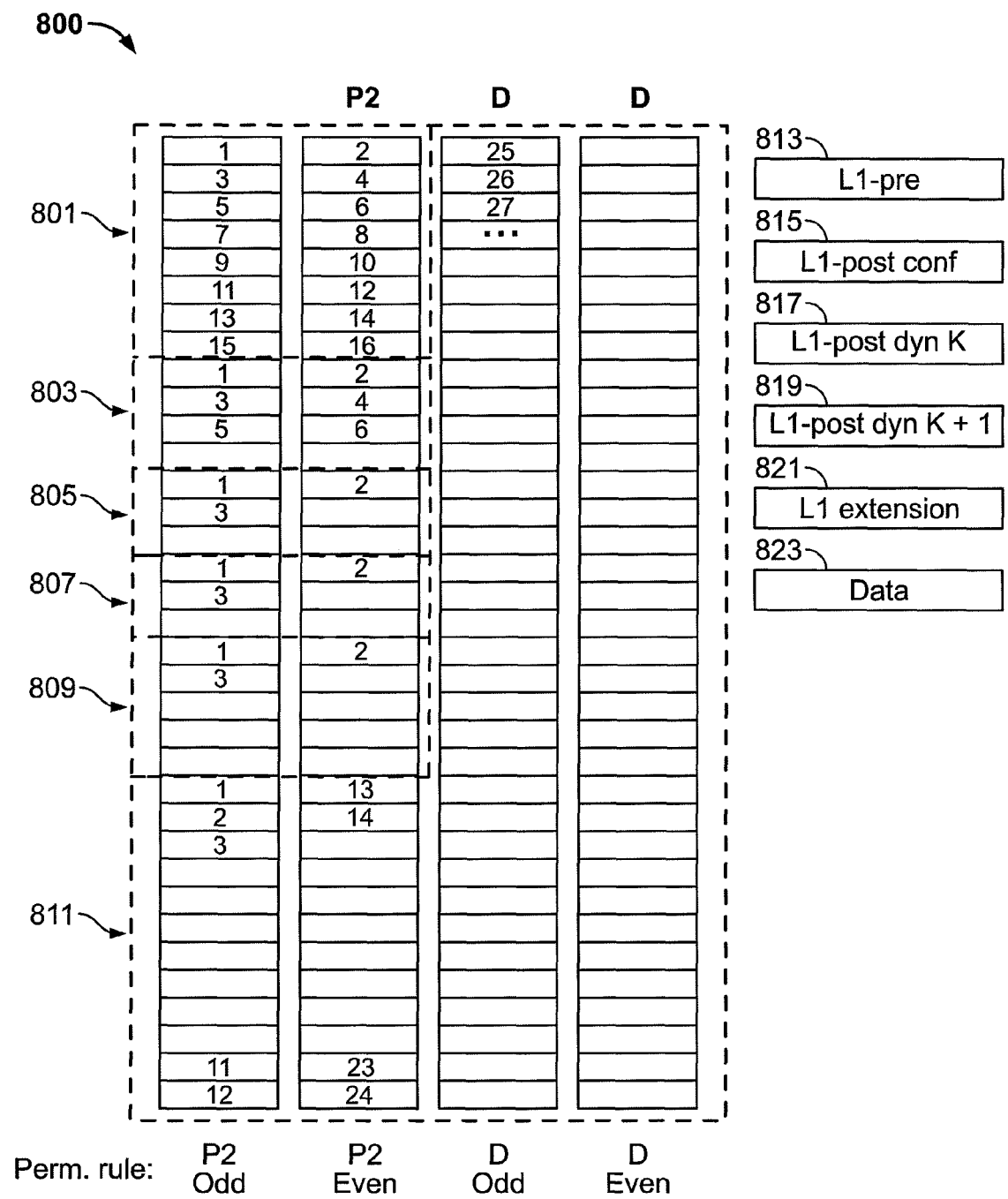
FIG. 8 shows a mapping of signaling cells to P2 symbols in accordance with an embodiment of the invention.

FIG. 8 shows a mapping of signaling cells to P2 symbols before the frequency interleaver in accordance with an embodiment of the invention. (A cell corresponds to the modulation value for one OFDM carrier during one OFDM symbol, e.g. a single constellation point.) FIG. 8 shows a possible mapping of the OFDM cells to P2 symbols. (In the example, 2 P2 symbols are used.) (The numeric values within each cell are exemplary and refer to the order in which the data parts are mapped to P2 symbols.) Cell groups 801, 803, 805, 807, and 809 are mapped to pre-signaling data 813, configurable data 815, dynamic data for the current frame 817, dynamic data for the next frame 819, and extension data 821, respectively. Remaining OFDM cell group 811 is mapped to data symbols 823. With an embodiment of the invention, the time interleaver for L1-pre-signaling data and post-signaling data may correspond to the time interleaver specified in be DVB-T2. Thus, each L1-signaling part may obtain the best possible time diversity available for P2 symbols.

Figure 9:
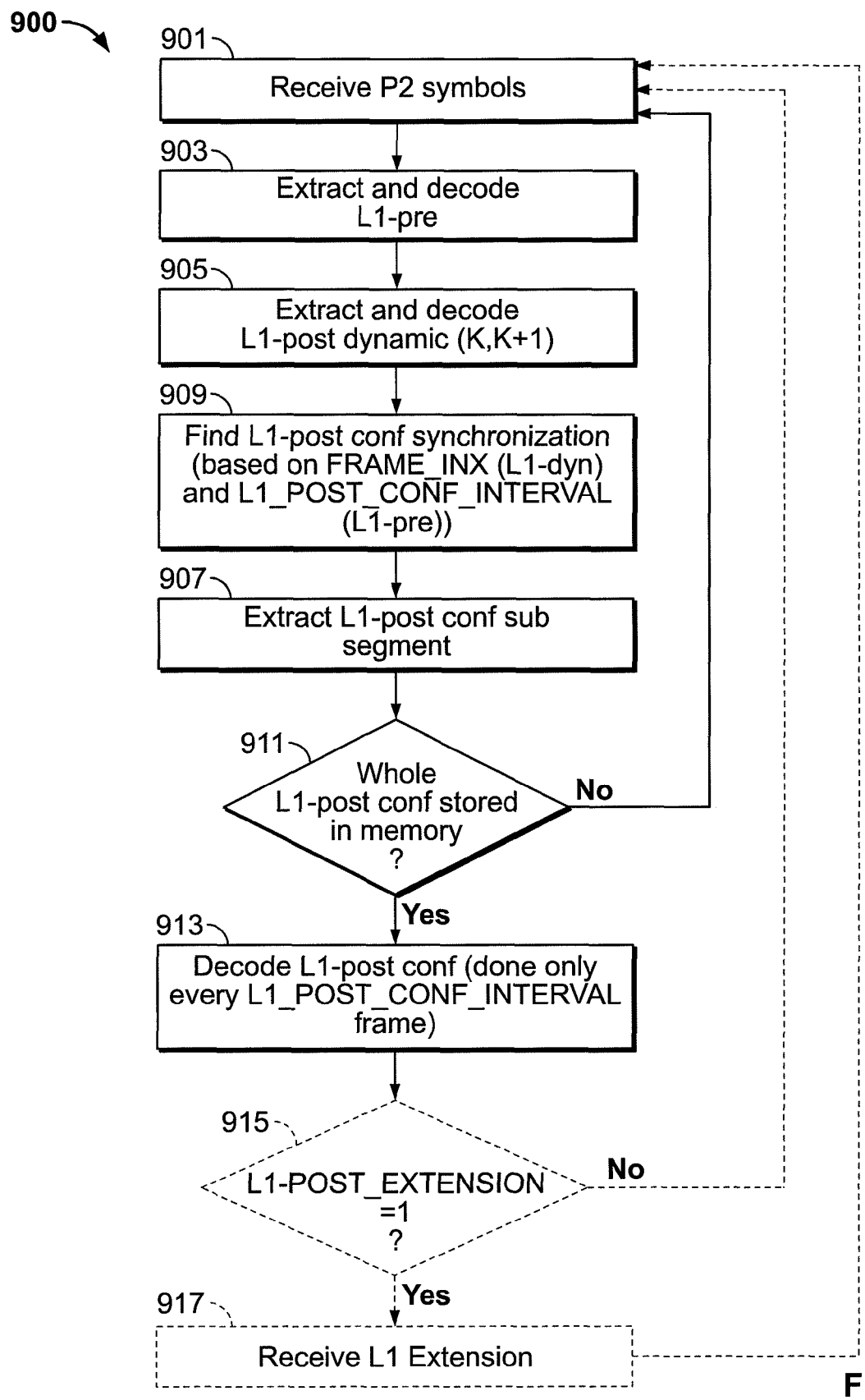
FIG. 9 shows a flow diagram for decoding physical layer post-signaling data in accordance with an embodiment of the invention.

FIG. 9 shows flow diagram 900 for decoding physical layer post-signaling data in accordance with an embodiment of the invention. The P2 symbols are received in step 901, which contains pre-signaling, post-signaling, and extension data. Extension may or may not be included in a frame as indicated by L1-POST_EXTENSION parameter 614 in the pre-signaling data as shown in FIG. 6.

In step 903, pre-signaling data is extracted so that the necessary parameters (shown in FIG. 6) may be determined. In step 905, the dynamic data is extracted. If the optional L1-dyn repetition is used, data for both L1-post dyn K and L1-post dyn K+1 are extracted. In case the repetition is not used, only the L1-post dyn K data is extracted. In case the repetition is employed, if the same modulation and coding were always used for both L1-dyn parts, the sizes of L1-post dyn K and L1-post dyn K+1 are the same and therefore they don't need to be announced twice. If different modulation and coding for L1-post dyn for current and the next frames are desired, the parameters for both parts of L1-post dyn may be separately signaled in pre-signaling data. With the additional L1-presignaling parameters previously discussed, L1_POST_DYN_MOD 608 and L1_POST_DYN_COD 609 pertain to both L1-dyn parts, so the modulation and coding are the same for both dynamic parts.

In order to achieve frame synchronization in step 909, the FRAME_IDX parameter in L1-post dyn may be used. (FRAME_IDX is an 8-bit parameter that is contained in the dynamic data. It is the index of the current T2-frame within a super frame. The index of the first frame of the super frame is typically set to '0'.) For example, the position of the configurable data is determined from FRAME_IDX in relation to the known number of segments in the configurable data (as indicated in L1_POST_CONF_INTERVAL 605). Once the synchronization is found in step 909, the configurable data (which spans a plurality of frames) is extracted because it contains modulation and coding parameters for each PLP.

In step 907, the signaling segment with configurable data in the current received frame is extracted. (With some embodiments of the invention, steps 905 and 907 may occur in a different order.) The L1-post dynamic (for the current frame) is received in order to find the position of the current frame within a super frame to enable the synchronization for the L1-post conf split over several frames. With some embodiments of the invention, if the L1-post conf synchronization can be found by some other means than L1-post dyn, the steps 905 and 907 can be performed in different order. Each signaling segment is stored in memory in step 911 until all of the signaling segments are received for the configurable data. (For example, for the configuration shown in FIG. 3, four signaling segments are extracted from four frames.) The configurable data may then be decoded in step 913 in accordance with the encoding of the transmitted configurable data in step 703 as shown in FIG. 7.

Once the L1-post conf data is received, extension may be extracted in steps 915 and 917 (if the presence of these fields is indicated by the respective pieces of signaling data) from the corresponding P2 symbol. After executing process 900, the receiver can continue to receive L2 signaling, ESG, etc.

Figure 10:
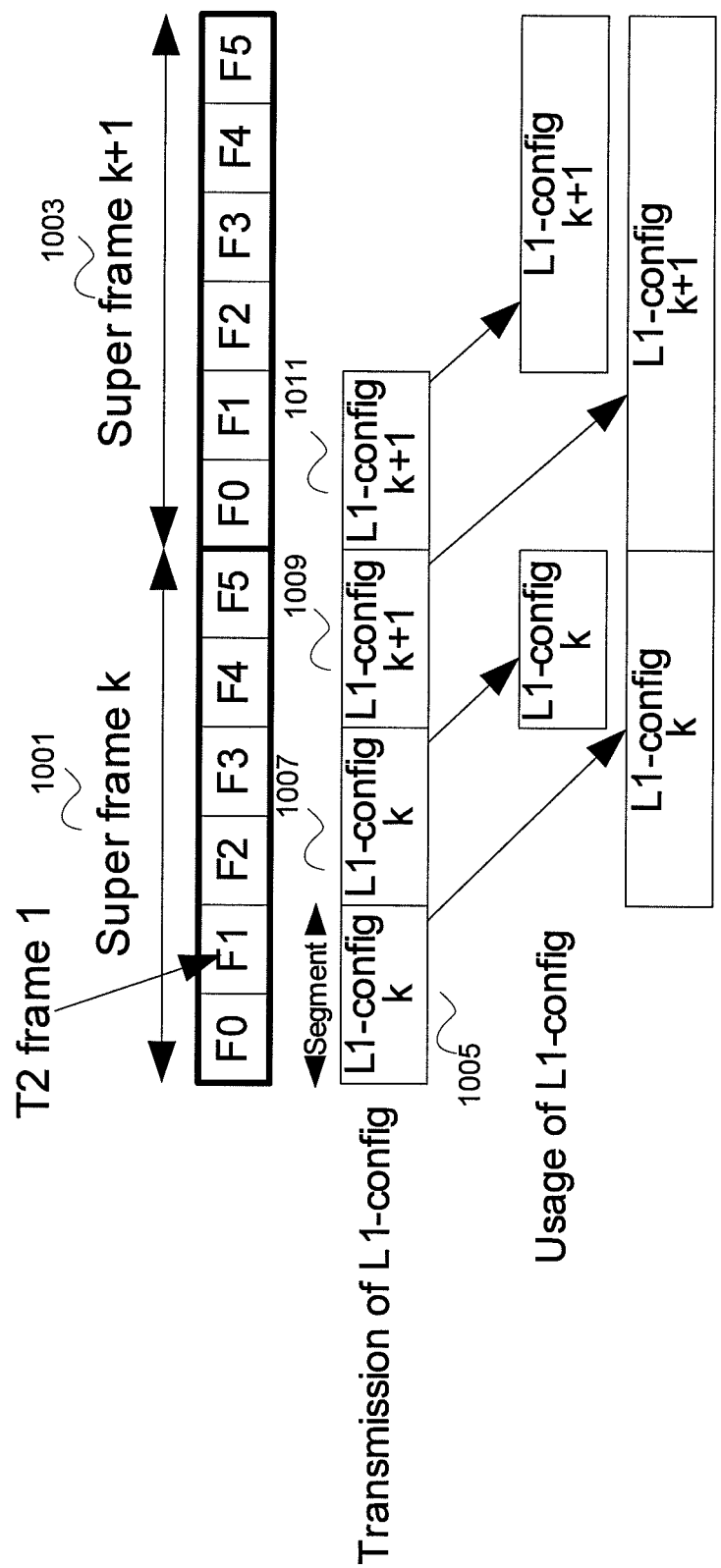
FIG. 10 shows a delay in physical layer configurable signaling data in accordance with an embodiment of the invention.
Figure 11:
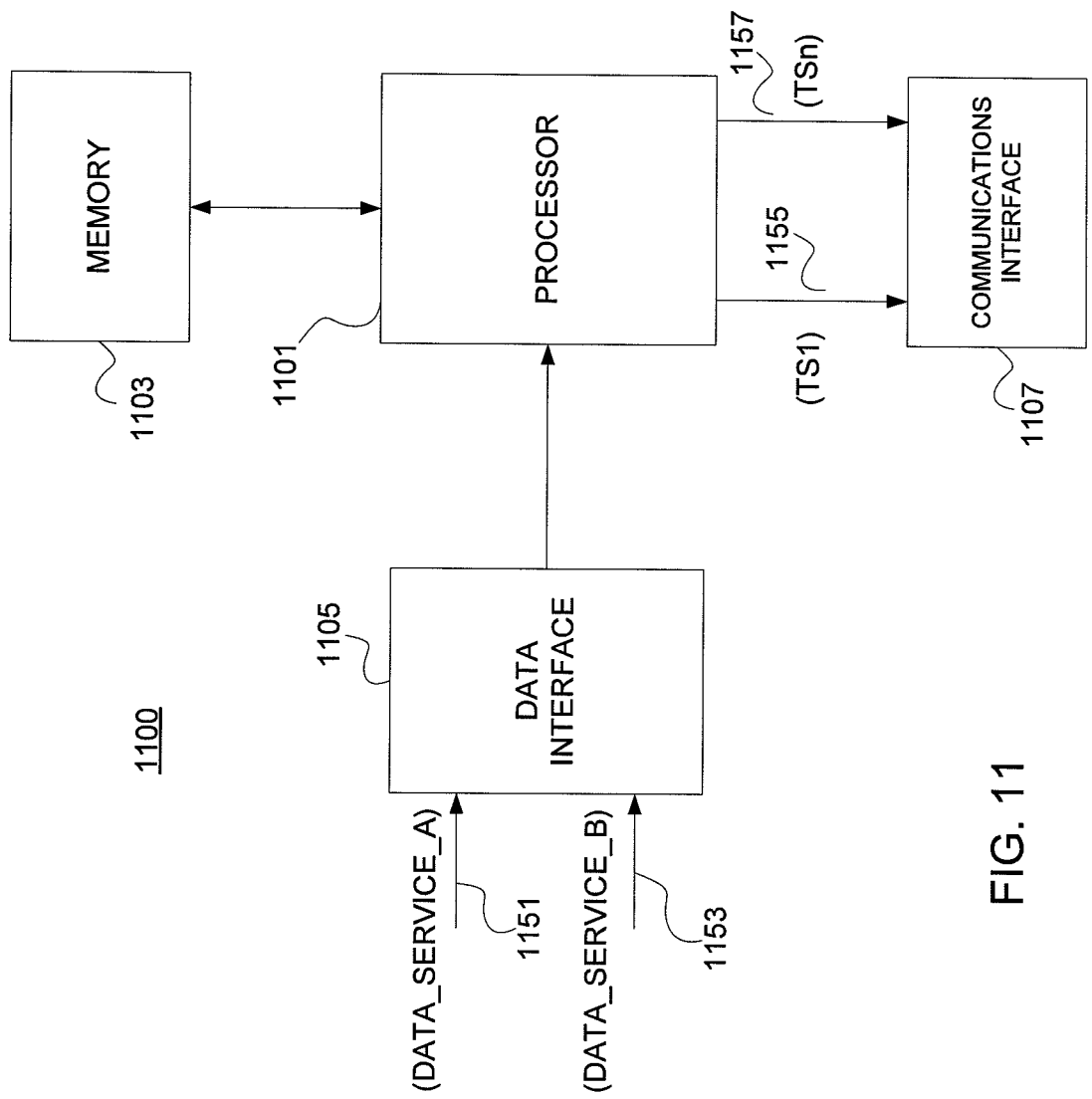
FIG. 11 shows an apparatus for generating a digital stream in accordance with an embodiment of the invention.
Figure 12:
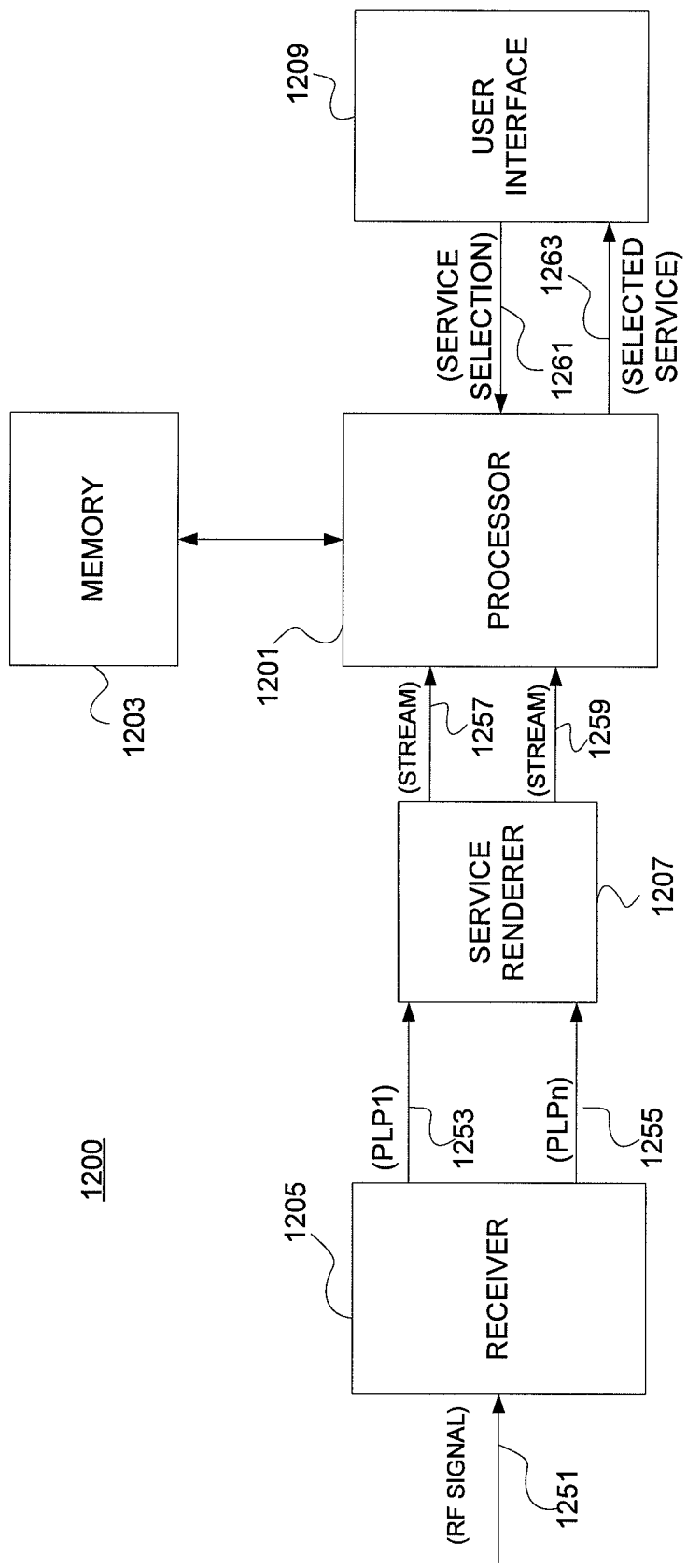
FIG. 12 shows an apparatus for processing a digital stream in accordance with an embodiment of the invention.

FIG. 10 shows a delay in physical layer configurable signaling data in accordance with an embodiment of the invention. With prior art (e.g., "Frame structure channel coding and modulation for a second generation digital terrestrial television broadcasting system (DVB-T2)," DVB Document A122, June 2008), parameters carried in the configurable data are valid during the frame that includes the configuration data.

With some embodiments of the invention, the configuration data (L1-config) is spread over M frames and is available after all the signaling segments of L1-config are received.

Consequently, the parameters carried in L1-config are valid until the end of the super frame after all signaling segments of L1-config are received. As shown in FIG. 10, L1-config k 1005 is sent in two segments transmitted in frames F0-F1 of super frame k 1001 and is valid in frames F2-F5 of super frame k 1001. The same information is sent in L1-config k 1007 in frames F2-F3 of super frame k 1001 and is valid in frames F4-F5 of super frame k 1001. The L1-config k+1 1009 is sent in two segments transmitted in frames F4-F5 of super frame k 1001 and are valid in frames F0-F5 in the super frame k+1 1003. L1-config k+1 1011 is sent in two segments transmitted in frames F0-F1 of super frame k+1 1003 and is valid in frames F2-F5 of super frame k+1 1003.

With prior art, changes in the configuration are allowed only at the border of the super frames. Conventional approaches also require that the size of the L1 signalling remains the same during the super frame. For example, adding a new PLP would change the size of the signalling. This would not change signalling inside the super frame but from super frame to super frame.

With some embodiments of the invention, adding a new PLP would change the size of the L1-config signalling inside a super frame. If a new PLP were added in the super frame k+1 1003, the size of the L1-config segment 1009 would be larger than segment 1007. Consequently, embodiments of invention support changes in size and content between signaling segments in a super frame.

We claim:

1. A method comprising:
    receiving a plurality of signaling components comprising dynamic signaling data and static signaling data, wherein:
        each said signaling component contains parameters for decoding a data stream,
        the dynamic signaling data includes signaling data that changes over a plurality of data frames, and
        the static signaling data does not change over the plurality of data frames;
    encoding the dynamic signaling data to obtain a plurality of encoded dynamic signaling data blocks, wherein each of said plurality of encoded dynamic signaling data blocks is associated with one of the plurality of data frames;
    encoding the static signaling data to obtain an encoded static signaling data block that does not change over the plurality of data frames;
    distributing each of said plurality of encoded dynamic signaling data blocks over the plurality of data frames, resulting in each of said plurality of encoded dynamic signaling data blocks being placed into its associated data frame of the plurality of data frames;
    dividing the encoded static signaling data block over the plurality of data frames, resulting in each data frame of the plurality of data frames including a different segment of the encoded static signaling data block; and
    outputting the plurality of data frames.

2. The method of claim 1, further comprising:
    transmitting the plurality of data frames over at least a portion of a digital broadcasting system.

3. The method of claim 1, wherein the static signaling data comprises physical layer (L1) configurable data.

4. The method of claim 1, wherein the static signaling data comprises physical layer (L1) pre-signaling data.

5. The method of claim 1, wherein the plurality of data frames comprises a determined number of data frames.

6. The method of claim 2, wherein the plurality of data frames comprises a determined number of data frames and further comprising:
    sending a value of the determined number in physical layer pre-signaling data.

7. An apparatus comprising:
    a processor; and
    at least one memory storing computer executable instructions configured to, with the processor, cause the apparatus to:
    receive a plurality of signaling components comprising dynamic signaling data and static signaling data, wherein:
        each said signaling component contains parameters for decoding a data stream,
        the dynamic signaling data includes signaling data that changes over a plurality of data frames, and
        the static signaling data does not change over the plurality of data frames;
    encode the dynamic signaling data to obtain a plurality of encoded dynamic signaling data blocks, wherein each of said plurality of encoded dynamic signaling data blocks is associated with one of the plurality of data frames;
    encode the static signaling data to obtain an encoded static signaling data block that does not change over the plurality of data frames;
    distribute each of said plurality of dynamic signaling data blocks over the plurality of data frames, resulting in each of said plurality of encoded dynamic signaling data blocks being placed into its associated data frame of the plurality of data frames; and
    divide the encoded static signaling data block over the plurality of data frames, resulting in each data frame of the plurality of data frames including a different segment of the encoded static signaling data block.

8. The apparatus of claim 7, wherein the at least one memory further stores computer executable instructions configured to, with the processor, cause the apparatus to:
    transmit the plurality of data frames over at least a portion of a digital broadcasting system.

9. The apparatus of claim 7, wherein each static signaling part comprises physical layer (L1) configurable data.

10. The apparatus of claim 7, wherein the static signaling data comprises physical layer (L1) pre-signaling data.

11. A non-transitory computer-readable medium storing computer-executable instructions configured to, when executed, cause an apparatus to:
    receive a plurality of signaling components comprising dynamic signaling data and static signaling data, wherein:
        each said signaling component contains parameters for decoding a data stream,
        the dynamic signaling data includes signaling data that changes over a plurality of data frames, and
        the static signaling data does not change over the plurality of data frames;
    encode the dynamic signaling data to obtain a plurality of encoded dynamic signaling data blocks, wherein each of said plurality of encoded dynamic signaling data blocks is associated with one of the plurality of data frames;
    encode the static signaling data to obtain an encoded static signaling data block that does not change over the plurality of data frames;
    distribute each of said dynamic signaling data blocks over the plurality of data frames, resulting in each of said encoded dynamic signaling data blocks being placed into its associated data frame of the plurality of data frames; and
    divide the encoded static signaling part data block over the plurality of data frames, resulting in each data frame of the plurality of data frames including a different segment of the encoded static signaling data block.

12. The non-transitory computer-readable medium of claim 11, further storing computer executable instruction configured to, when executed, cause the apparatus to:
transmit the plurality of data frames over at least a portion of a digital broadcasting system.

13. The non-transitory computer-readable medium of claim 11, wherein the static signaling data comprises physical layer (L1) configurable data.

14. The non-transitory computer-readable medium of claim 11, wherein the static signaling data comprises physical layer (L1) pre-signaling data.

15. The non-transitory computer-readable medium of claim 11, wherein the plurality of data frames comprises a determined number of data frames.

16. The non-transitory computer-readable medium of claim 12, wherein the plurality of data frames comprises a determined number of data frames and wherein the computer-readable medium further stores computer executable instructions that, when executed, cause the apparatus to:
send a value of the determined number in physical layer pre-signaling data.

17. A method comprising:
receiving, at a computing device, a plurality of data frames including dynamic signaling data and static signaling data;
extracting the dynamic signaling data from a frame of the plurality of data frames, the extracted dynamic signaling data representing signaling data for data symbols included in at least one of the plurality of frames;
extracting a different segment of the static signaling data from each of the plurality of data frames, resulting in a plurality of static signaling segments;
combining the plurality of static signaling data segments to form a static signaling component representing signaling data for data symbols included in each of the plurality of data frames; and
using the static signaling component and the extracted dynamic signaling portion to decode data symbols included in the plurality of data frames.

18. The method of claim 17, further comprising:
receiving a signal containing the plurality of data frames from a component of a digital broadcasting system.

19. The method of claim 17, wherein the static signaling component comprises configurable data.

20. The method of claim 17, wherein the static signaling component comprises pre-signaling data.

21. The method of claim 19, further comprising:
configuring a physical layer pipe (PLP) in accordance with the configurable data; and
activating the PLP during a same super frame as the configurable data.

22. The method of claim 19, further comprising:
configuring a physical layer pipe (PLP) in accordance with the configurable data; and
activating the PLP during a next super frame after receiving the configurable data.

23. The method of claim 17, further comprising:
performing a frame synchronization for the plurality of static signaling segments based on a frame index and a frame interval, wherein the frame interval spans M data frames.

24. The method of claim 18, further comprising:
performing a frame synchronization for the plurality of static signaling segments based on a frame index and a frame interval, wherein the frame interval spans M data frames; and
determining said M from physical layer pre-signaling data.

25. The method of claim 18, further comprising:
performing a frame synchronization for the plurality of static signaling segments based on pre-signaling data.

26. An apparatus comprising:
a processor; and
at least one memory storing computer executable instructions configured to, with the processor, cause the apparatus to:
receive a plurality of data frames including dynamic signaling data and static signaling data;
extract the dynamic signaling data from a frame of the plurality of data frames, the extracted dynamic signaling data representing signaling data for data symbols included in at least one of the plurality of data frames;
extract a different segment of the static signaling data from each of the plurality of data frames, resulting in a plurality of static signaling segments;
combine the plurality of static signaling data segments to form a static signaling component representing signaling data for data symbols included in each of the plurality of data frames; and
use the static signaling component and the extracted dynamic signaling data to decode data symbols included in the plurality of data frames.

27. The apparatus of claim 26, wherein the at least one memory further stores computer executable instructions configured to, with the processor, cause the apparatus to:
receive a signal containing the plurality of data frames from a component of a digital broadcasting system.

28. The apparatus of claim 26, wherein the static signaling component comprises configurable data.

29. The apparatus of claim 26, wherein the static signaling component comprises pre-signaling data.

30. The apparatus of claim 28, wherein the at least one memory further stores computer executable instructions configured to, with the processor, cause the apparatus to:
configure a physical layer pipe (PLP) in accordance with the configurable data; and
activate the PLP during a same super frame as the configurable data.

31. The apparatus of claim 28, wherein the at least one memory further stores computer executable instructions configured to, with the processor, cause the apparatus to:
configure a physical layer pipe (PLP) in accordance with the configurable data; and
activate the PLP during a next super frame after receiving the configurable data.

32. The apparatus of claim 26, wherein the at least one memory further stores computer executable instructions configured to, with the processor, cause the apparatus to:
perform a frame synchronization for the plurality of static signaling segments based on a frame index and a frame interval, wherein the frame interval spans M data frames; and
determine said M from a predetermined value.

33. The apparatus of claim 27, wherein the at least one memory further stores computer executable instructions configured to, with the processor, cause the apparatus to:
perform a frame synchronization for the plurality of static signaling segments based on a frame index and a frame interval, wherein the frame interval spans M data frames; and
determine said M from physical layer pre-signaling data.

34. The apparatus of claim 27, wherein the at least one memory further stores computer executable instructions configured to, with the processor, cause the apparatus to:

perform a frame synchronization for the plurality of static signaling segments based on pre-signaling data.

35. A non-transitory computer-readable medium storing computer-executable instructions configured to, when executed, cause an apparatus to:
- receive a plurality of data frames including dynamic signaling data and static signaling data;
- extract the dynamic signaling data from a frame of the plurality of data frames, the extracted dynamic signaling data signaling data for data symbols included in at least one of the plurality of data frames;
- extract a different segment of the static signaling data from each of the plurality of data frames, resulting in a plurality of static signaling segments;
- combine the plurality of static signaling data segments to form a static signaling component representing signaling data for data symbols included in each of the plurality of data frames; and
- use the static signaling component and the extracted dynamic signaling data to decode data symbols included in the plurality of data frames.

36. The non-transitory computer-readable medium of claim 35, further storing computer executable instructions configured to, when executed, cause the apparatus to:
- receive a signal containing the plurality of data frames from a component of a digital broadcasting system.

37. The non-transitory computer-readable medium of claim 35, wherein the static signaling component comprises configurable data.

38. The non-transitory computer-readable medium of claim 35, wherein the static signaling component comprises pre-signaling data.

39. The non-transitory computer-readable medium of claim 37, further storing computer executable instructions configured to, when executed, cause the apparatus to:
- configure a physical layer pipe (PLP) in accordance with the configurable data; and
- activate the PLP during a same super frame as the configurable data.

40. The non-transitory computer-readable medium of claim 37, further storing computer executable instructions configured to, when executed, cause the apparatus to:
- configure a physical layer pipe (PLP) in accordance with the configurable data; and
- activate the PLP during a next super frame after receiving the configurable data.

41. The non-transitory computer-readable medium of claim 35, further storing computer executable instructions configured to, when executed, cause the apparatus to:
- perform a frame synchronization for the plurality of static signaling data segments based on a frame index and a frame interval, wherein the frame interval spans M data frames; and
- determine said M from a predetermined value.

42. The non-transitory computer-readable medium of claim 36, further storing computer executable instructions configured to, when executed, cause the apparatus to:
- perform a frame synchronization for the plurality of static signaling data segments based on a frame index and a frame interval, wherein the frame interval spans M data frames; and
- determine said M from physical layer pre-signaling data.

43. The non-transitory computer-readable medium of claim 36, further storing computer executable instructions configured to, when executed, cause the apparatus to:
- perform a frame synchronization for the plurality of static signaling data segments based on pre-signaling data.

* * * * *

UNITED STATES PATENT AND TRADEMARK OFFICE
CERTIFICATE OF CORRECTION

PATENT NO. : 8,498,312 B2
APPLICATION NO. : 12/244408
DATED : July 30, 2013
INVENTOR(S) : Karri Pekonen et al.

It is certified that error appears in the above-identified patent and that said Letters Patent is hereby corrected as shown below:

In the Claims:

Column 10, Claim 11, Line 64:
   Please delete "part"

Column 11, Claim 17, Line 38:
   Please delete "portion" and replace with --data--

Column 13, Claim 35, Line 9:
   Please add "representing" after data and before signaling Signed and Sealed this
Nineteenth Day of November, 2013

Teresa Stanek Rea
*Deputy Director of the United States Patent and Trademark Office*